Figure 1:
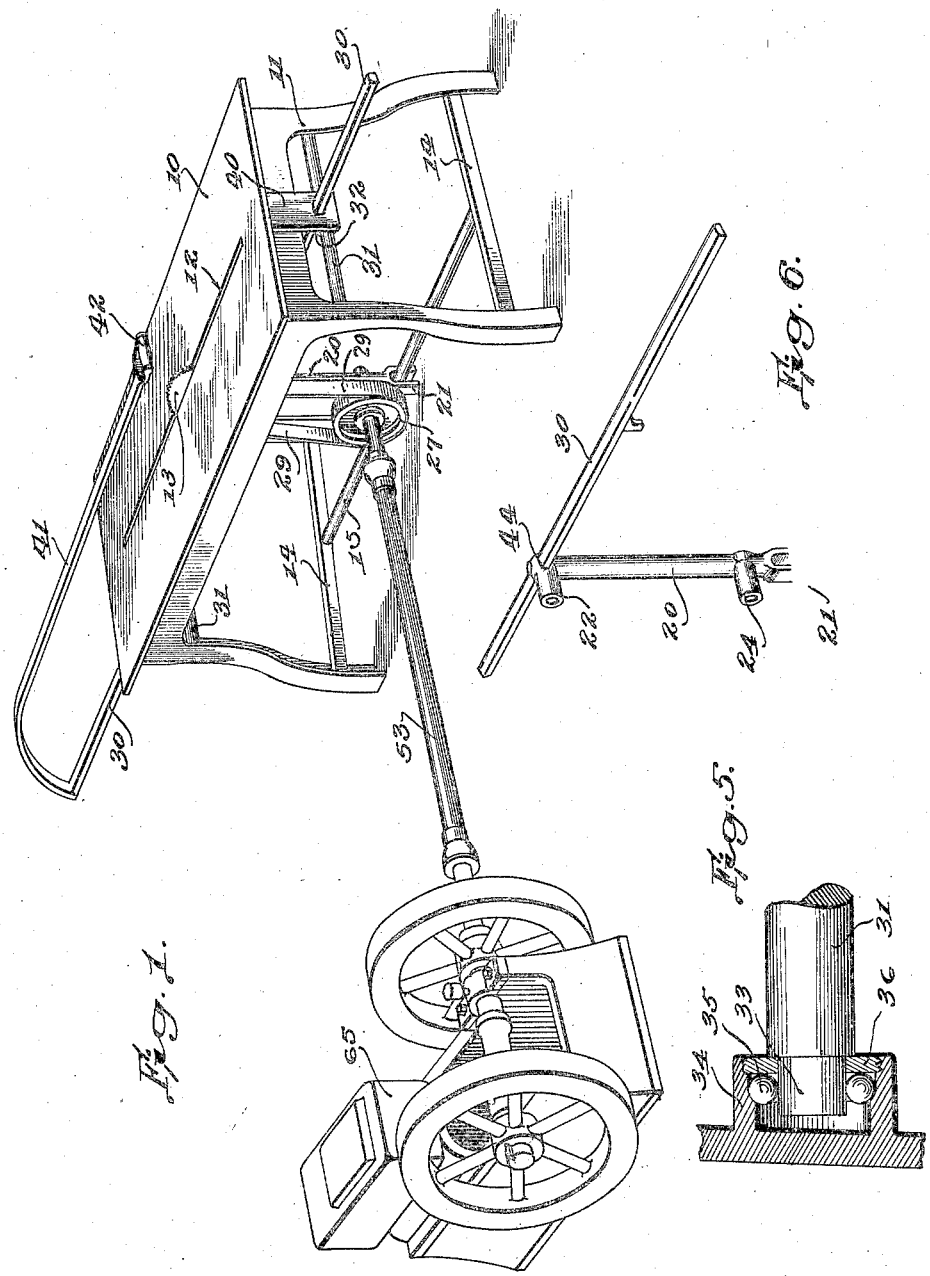

June 10, 1930.                C. E. PALMETER                1,763,478
                                  SAW TABLE
                              Filed May 10, 1928         2 Sheets-Sheet 1

INVENTOR
*CLARENCE PALMETER*
BY
ATTORNEY

June 10, 1930.  C. E. PALMETER  1,763,478
SAW TABLE
Filed May 10, 1928    2 Sheets-Sheet 2

INVENTOR
CLARENCE PALMETER
BY
ATTORNEY

Patented June 10, 1930

1,763,478

UNITED STATES PATENT OFFICE

CLARENCE E. PALMETER, OF MOUNT STERLING, KENTUCKY

SAW TABLE

Application filed May 10, 1928. Serial No. 276,674.

This invention relates to saw tables.

An object of the invention is the provision of a saw table provided with a movable frame supporting and rotating a circular saw, the axis of the saw being maintained in approximately a horizontal position, driving connections for a universal drive shaft being connected with the rotating means for the saw and a source of power whereby the saw may be moved in any position desired for cutting off pieces of lumber.

A further object of the invention is the provision of a movable frame for supporting a circular saw in substantially a horizontal plane, manual means being employed for moving the supporting frame and the saw together with its operating means longitudinally of the table, said manual actuating means being employed for supporting a frame which carries the saw.

This invention will be best understood from a consideration of the following detailed description, in connection with the accompanying drawings; nevertheless, it is to be understood that the invention is not confined to the disclosure being susceptible of such changes and modifications as shall define no material departure from the salient features of the invention as expressed in the appended claim.

In the drawings:—

Figure 2:
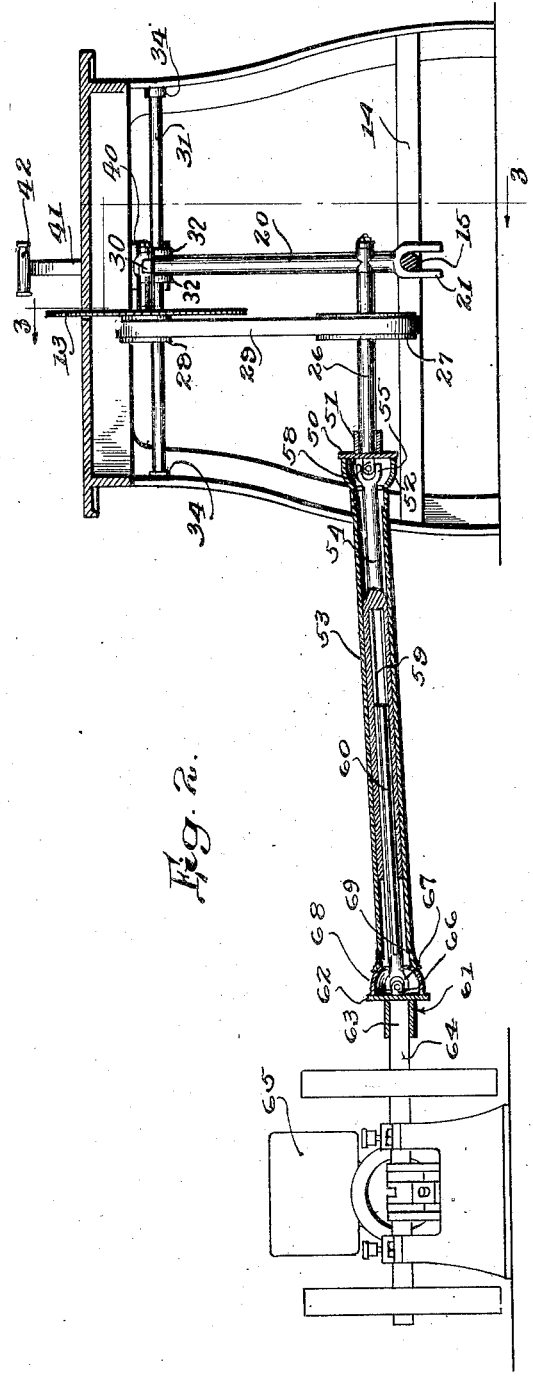
Figure 3:
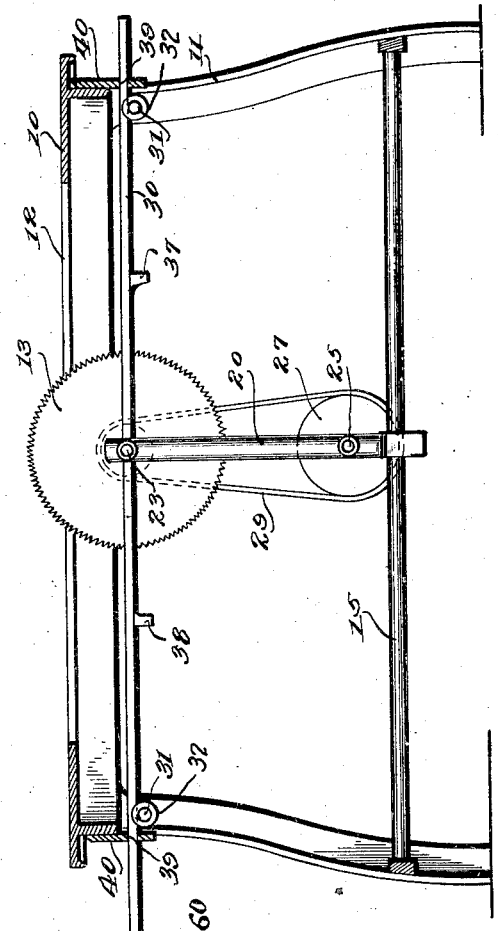
Figure 4:
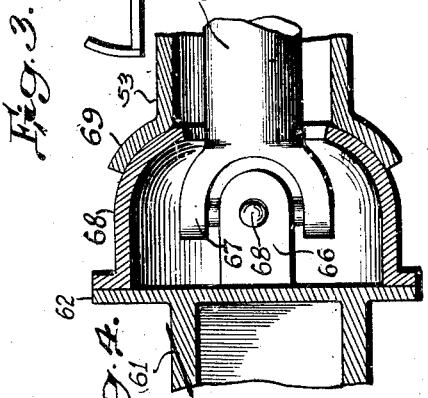

Figure 1 is a perspective view of a saw table constructed according to the principles of my invention, Figure 2 is a transverse vertical section of the saw table, Figure 3 is a vertical section taken along the line 3—3 of Fig. 2, Figure 4 is an enlarged vertical section through a universal joint for the drive shaft, Figure 5 is a fragmentary vertical section showing the bearings for the end of a roller, Figure 6 is a view in perspective of the supporting bar or frame for a counter shaft to which the circular saw is connected.

Referring more particularly to the drawings 10 designates a table top mounted on legs 11. The top has a longitudinal slot 12 through which a circular saw 13 projects, a portion also being located above the surface of the table 10. To brace bars 14 is secured a guide bar 15 running longitudinally and centrally of the table.

A supporting rod 20 or frame for the circular saw 13 is normally located in a vertical plane and is provided with a fork 21 engaging over the guide rod 15. The upper end of the rod 20 is provided with a bearing 22 adapted to receive a counter shaft 23. The lower end of the rod is provided with a bearing 24 adapted to receive the reduced end 25 of a shaft 26 upon which a pulley 27 is mounted and secured thereto for rotation. A pulley 28 is secured to the counter shaft 23, and a belt 29 is trained over the pulleys 27 and 28. The saw 13 is connected likewise to the countershaft and is revolved thereby.

A rod 30 is mounted on a pair of rollers 31 and between collars 32 fixed to said rollers. The ends of the rollers are reduced as shown at 33 to be received within a collar 34 which provides a housing for the balls 35 to support the reduced end of the rollers 31. A washer 36 is threaded into the outer end of the collar 34 for maintaining the balls in position.

The rod 30 has a pair of spaced lugs 37 and 38 which are adapted to engage a roller 31 to limit the movement of the rod 30 in opposite directions. Said rod is movable in passages 39 formed in the end flanges 40 of the table for maintaining said rod in a horizontal position during its reciprocating movement. An arm 41 extends above the table top 10 and has a hand grip 42 to permit the operator to move the bar longitudinally of the table.

The rod 30 is connected at 44 to the top of the supporting rod 20. A plate 50 provided with a socket 51 engages the outer end of an expanded portion 52 of a tube 53. The socket 51 is adapted to receive the outer end of the shaft 26 and is secured thereto. A section of the shaft 54 has a yoke 55 hingedly connected by means of a pair of pins 56 and 57 to a yoke 58 formed on the inner face of the plate 50. This shaft 54 is provided with an elongated socket 59 which is square in cross section and adapted to receive a shaft 60 which is similarly formed in cross section, whereby the shaft 60 will rotate the shaft 54, while permitting the said shafts to be moved longitudinally of each other.

A socket 61 is formed integrally with the plate 62 and is adapted to receive the squared end 63 of a shaft 64 connected with an engine 65. The inner face of the plate 62 is provided with a yoke 66 hingedly connected with a yoke 67 formed on the shaft 60 to provide a universal joint between the socket 61 and the shaft 60. A bearing 68 secured to the plate 62 is received within a socket 69 formed at one end of the tube 53.

The operation of my device is as follows: A squared end 63 of the shaft 64 is received by the socket 61 so that rotation of the shaft 64 by the engine 65 will cause rotation of the shafts 54 and 60 and likewise the shaft 26, thereby rotating pulleys 27 and 28 which revolve the circular saw 13 within the slot 12 of the table top 10. A piece of wood to be cut is placed transversely of the table top 10 on either side of the saw 13 and the hand piece 42 is gripped and moved in the direction of the position of the piece of wood, whereby the saw 13 which is revolving will cut off the portion of the wood desired. It will be appreciated that the piece of wood to be cut must be placed to that side of the circular saw 13 whereby the same may be cut. The saw may be also employed for ripping lumber by placing the lumber longitudinally of the table 10 and moving the hand grip 42 longitudinally of the table. Guides may be employed on the table if desired.

When the hand grip is moved longitudinally of the table the rod 30 is likewise moved in the same direction and since said rod carries the saw and supports the rod 20 which carries the shaft 25 and the pulley 27, the whole saw jig will be moved. the fork 21 being guided by the rod 15. When the rod 20 is moved longitudinally of the table the shaft 26 and likewise the tube 53 is oscillated through an angle depending upon the extent of movement of the saw. Due to the fact that the shaft 64 and shaft 60 are mounted slidably relative to each other, these shafts will be extended in order to accommodate the variations in the distance between socket 61 and the bearing 24. The housing 53 will prevent the operator from coming into contact with the revolving parts contained therein.

It will be noted by this construction that the rod 20 or supporting frame for the saw 13 and the pulleys 27 and 28 will be maintained in a vertical plane when being moved longitudinally of the table so that the axis of the saw 13 will also be maintained in a horizontal plane during the longitudinal movement of the saw.

I claim:—

A saw table comprising a supporting frame, a rod movable longitudinally of the frame, a handle connected to one end of the rod for shifting said rod, bearings for said rod carried by the table, a supporting rod depending from the movable rod and rigidly connected at its upper end to said rod, the supporting rod having a bearing, a countershaft mounted in the bearing, a saw secured to the countershaft, a guide rod located in a vertical plane which passes through the movable rod and the supporting rod and mounted longitudinally on the frame, the lower end of the supporting rod having means engageable with the guide rod aiding in maintaining the supporting rod in a vertical plane, driving means mounted on the lower end of the supporting rod and operatively connected with the countershaft, and means for actuating the driving means.

Signed at Mount Sterling in the county of Montgomery and State of Kentucky this 7th day of May, A. D. 1928.

CLARENCE E. PALMETER.